United States Patent [19]

Wilkinson, III

[11] Patent Number: 4,858,861
[45] Date of Patent: Aug. 22, 1989

[54] CLAMP-TYPE PIPE SHOE AND METHOD

[76] Inventor: Joseph Wilkinson, III, Rte. 6, Box 6142, Brazoria, Tex. 77422

[21] Appl. No.: 247,949

[22] Filed: Sep. 22, 1988

[51] Int. Cl.⁴ .............................................. F16L 3/08
[52] U.S. Cl. ..................................... 248/74.1; 24/514; 29/525.1; 248/74.4; 248/316.5; 269/238; 269/268; 403/385; 403/386
[58] Field of Search .................... 248/74.1, 74.4, 74.5, 248/73, 65, 67.7, 231.5, 316.6, 316.5, DIG. 1; 24/19, 514; 29/526.1; 269/238, 268; 403/386, 385

[56] References Cited

U.S. PATENT DOCUMENTS

| | | | |
|---|---|---|---|
| 581,991 | 5/1897 | Homan | 24/514 |
| 2,080,261 | 5/1937 | Funk | 248/231.5 X |
| 4,437,791 | 3/1984 | Reynolds | 403/386 X |
| 4,516,296 | 5/1985 | Sherman | 248/74.1 X |
| 4,619,447 | 10/1986 | Blake | 24/514 X |

FOREIGN PATENT DOCUMENTS

| | | | |
|---|---|---|---|
| 2233077 | 1/1974 | Fed. Rep. of Germany | 248/74.1 |
| 0448202 | 3/1968 | Switzerland | 248/74.1 |

OTHER PUBLICATIONS

3" Shoe Insulated Stainless, Non-Ferrous Pipe.

Primary Examiner—Ramon O. Ramirez
Attorney, Agent, or Firm—Browning, Bushman, Zamecki & Anderson

[57] ABSTRACT

An improved pipe shoe is provided for permanently supporting a length of insulated pipe above a pipe rack of the type used in industrial facilities. The pipe shoe includes a base member for sliding engagement with the pipe rack, a first clamp member including a spacer portion, a first clamp portion, and a through slot. A second clamp member includes a second clamp portion and a projecting plate, such that the plate can be fitted within the through slot and the second clamp member rotated to its closed position. A securing member retains the plate adjacent the spacer portion, so that adjacent edges of elongate insulation members may be positioned on opposing sides of the spacer portion and the adjacent plate. The insulation thus retains its generally sleeve-like configuration about the pipe and the pipe shoe, thereby decreasing the time required to install the insulation. The pipe shoe is configured such that a lowermost portion of the pipe is spaced out of engagement with the first and second clamp members when in the closed position, with the gap between the pipe and the first and second clamp members providing a through path for receiving a heating line.

20 Claims, 2 Drawing Sheets

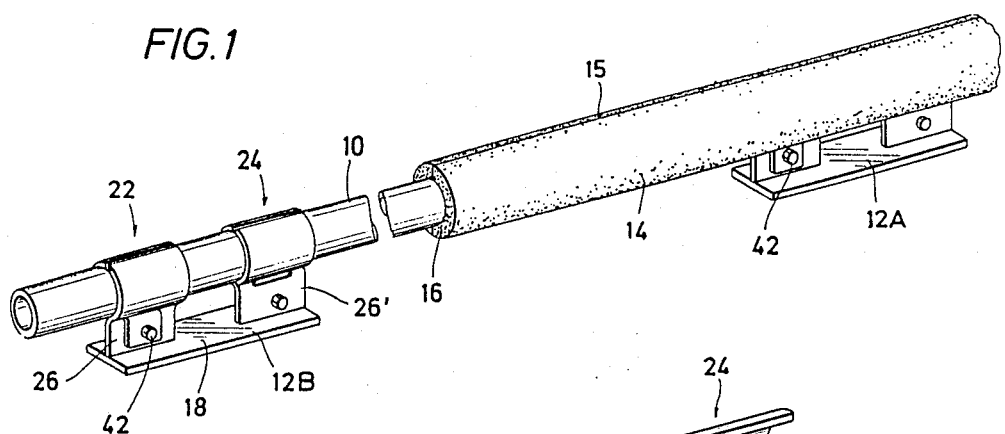
FIG. 1
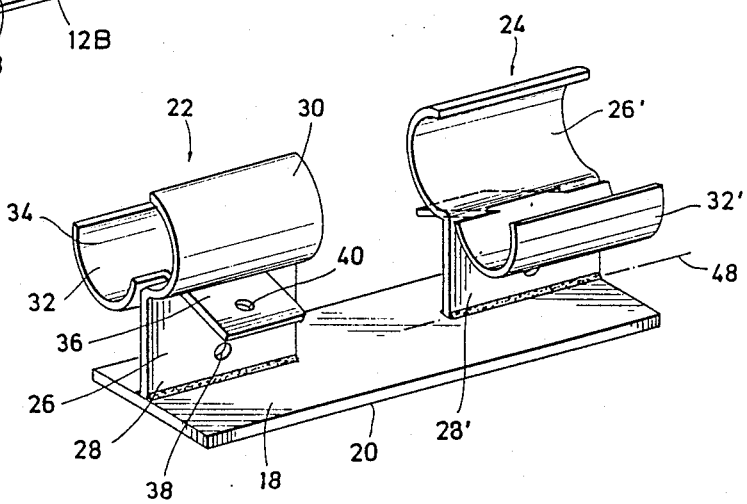
FIG. 2
FIG. 3
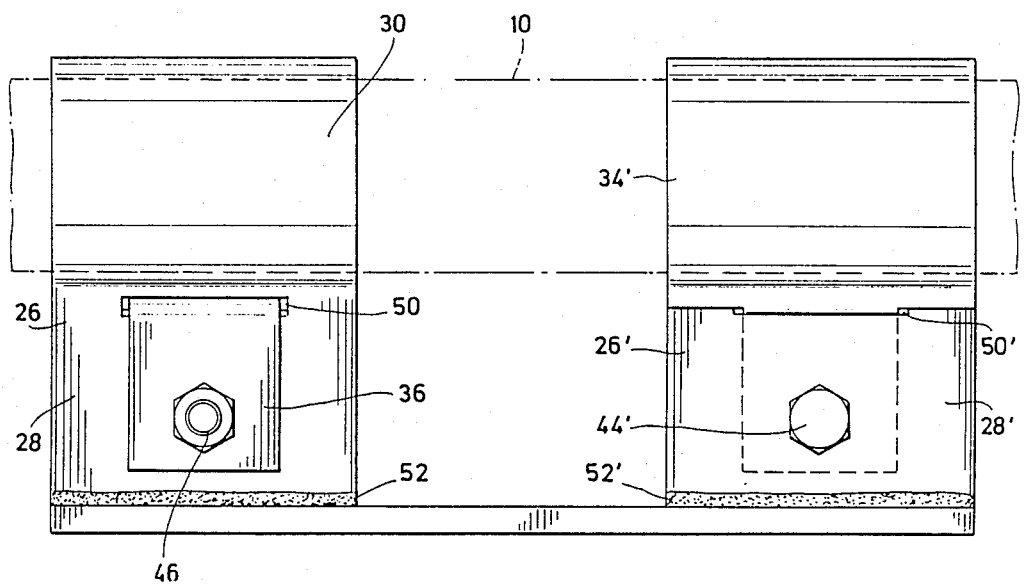

CLAMP-TYPE PIPE SHOE AND METHOD

BACKGROUND OF THE INVENTION

1. Field of the Invention

The present invention relates to devices for supporting elongate tubular members and, more particularly, relates to an improved pipe shoe of the clamp-type for supporting lengths of insulated pipe during service above a pipe rack in an industrial or commercial facility.

2. Description of the Background

Commercial and industrial facilities, such as petrochemical plants, frequently support their process piping on a series of inverted U-shaped overhead racks each having a generally horizontal planar top surface. A dozen or more generally parallel pipes are typically supported at 6 to 12 inch spacings on the pipe racks, and carry gas or liquids throughout the facility. It is generally preferred that the process piping not rest directly on each pipe rack, and pipe shoes are thus commonly used to support each pipe a desired distance above the top surface of each pipe rack. Since the process piping is supported above the planar surface of the pipe rack, the piping may be initially installed on the pipe shoes, and the pipe thereafter wrapped or covered with an insulation to (a) retain heat within the fluid passing through the process piping, or (b) minimize the likelihood that liquids in the process piping will freeze during cold weather. Pipe shoes thus enable process piping to be insulated much more economically than if the piping had to be raised above the rack to install the insulation, then relowered onto the rack. Moreover, pipe shoes keep both the pipe and the insulation physically separated from the pipe rack, so that neither the pipe nor the insulation will be susceptible to deterioration. Such pipe shoes may be provided at, e.g. 20 foot intervals along the length of the process piping, and a single industrial petrochemical facility may utilize 100,000 pipe shoes or more to support its process piping on the pipe racks.

The prior art pipe shoes most commonly used include a base and a pair of axially spaced clamps for interconnecting the base to the pipe. The base comprises an inverted T-shaped member, so that the base can easily slide along the planar upper surface of the pipe rack as the process pipe thermally expands or contracts in length. A lower generally semi-circular clamp half is welded to each end of the base, so that the pipe "sits" in the lower clamp halves. An ear projects radially outward from each side of both the lower and upper clamp halves, so that the pipe may be fixedly connected to a base by placing the upper clamp half over the supported pipe, and interconnecting the mating radially-opposing ears of the upper and lower clamp halves with a pair of conventional bolts.

In spite of its widespread use, the above pipe shoe has significant disadvantages, particularly when used for supporting a pipe which will subsequently be insulated. Conventional pipe insulation typically is manufactured in axially split halves sized for a particular diameter pipe, so that the two insulation halves may be easily positioned about a pipe then taped or otherwise secured together to form an insulating sleeve of a desired thickness. Since the process pipe is supported by the pipe shoes along the rack, the insulation installer can quickly and reliably install this split insulation along the length of a given pipe between the shoes. The configuration of the shoes, however, presents a problem to the installer, particularly since the radially-opposing side ears project one inch or more outward from the pipe, and since the vertical bolts which interconnect the side ears are spaced significantly from the pipe. Accordingly, the installer typically cuts out a portion of the insulation where the clamp ears and bolts will be located, thereby allowing the sleeve-like insulation halves to be placed about the pipe and over the clamps. In many cases, the insulation installer must then "putty over" the cut out holes with a caulking material to reduce heat loss from the pipe. These operations take a significant amount of time, so that the cost of installing the insulation is directly related to the number of pipe shoes along the length of the process pipe.

Apart from the increased installation costs, the above described "repair" process does not adequately protect the pipe as well as the intended insulation does. The projecting ears on the clamp halves act as a heat sink, drawings valuable heat from the process pipe and releasing that heat to the atmosphere. The caulking tends to deteriorate, and in time cracks and breaks away from the projecting ears. Both the pipe and the insulation thus tend to deteriorate more quickly in the vicinity of the insulation cut outs, so that the useful life of the process line is decreased.

Another problem with prior art pipe shoes relating to deterioration concerns corrosion of the pipe and the shoe in the vicinity where the lowermost portion of the pipe engages the inner lowermost portion of the lower clamp half. Process piping frequently "sweats", so that relatively minor amounts of condensation on the outer surface of the pipe flow by gravity to the lowermost portion of the horizontal pipe. This sweating tends to present no serious problems, except at the locations of the pipe clamps. At these sites, the condensate encounters the area adjacent the adjoining lowermost arcuate surface of the pipe and the clamp, so that both the pipe and the clamp tend to corrode at these sites, thereby further decreasing the useful life of the process piping. This corrosion can be minimized by installing a plastic or other non-corrosive sheet between the inner surface of the lower clamp half and the pipe, although this additional operation again significantly increases the cost of installing the process pipe on the pipe rack.

A further disadvantage of prior art pipe shoes relates to the difficulty with running an electrical heating line or steam trace line along the insulated process piping to further reduce the likelihood of pipe breakage during cold weather. Such a heating line is often required to prevent the liquids in the pipe from freezing, but such lines are difficult to install when conventional pipe shoes are utilized. While the heating line can be run along the pipe and radially outside of the clamps when encountering a pipe shoe, this routing of the line decreases its efficiency. Moreover, this repeated routing of the heating lines around the pipe shoe clamps further increases installation costs, and leads to an increased number of points along the heating line which are susceptible to breakage, leakage, or other damage.

The disadvantages of the prior art are overcome by the present invention, and an improved pipe shoe and a method of installing a pipe shoe between a pipe and a pipe rack are hereinafter disclosed.

SUMMARY OF THE INVENTION

A pipe shoe according to the present invention is provided for supporting a process pipe on a pipe rack.

The shoe includes a base member for sliding engagement with a planar surface of the pipe rack, such that the pipe shoe may move with respect to the rack during thermal expansion and contraction of the process pipe.

According to one embodiment of the invention, a pair of axially spaced clamps include a corresponding pair of vertical sheet-like spacers each secured to the base for supporting the pipe above the base member. A first clamp portion is integrally formed at an upper end of each vertical support member, and has a C-shaped transverse cross-sectional configuration. A slot is provided in each of the axially spaced clamps adjacent the location where the lower portion of the first clamp portion engages the vertical spacer. A plate protrudes radially outwardly from a second clamp portion, and passes through the slot so that the second clamp portion may be pivotally movable from an opened position for receiving the process pipe to a closed position wherein the first and second clamp portions grip the process pipe. A securing bolt and nut bring the plate into a permanent position closely adjacent the vertical spacer when the second clamp portion is pivoted to its closed position, so that the first and second clamp members maintain a compressive force on the process pipe.

The thickness of the first and second clamp portions is such that the diameter of the closed clamp is not significantly greater than the diameter of the pipe, and the insulation may thus be fitted directly over the clamp and pipe interior thereof. The axial split in the insulation halves may be aligned with the vertical spacer member, so that the insulation need not be cut out, or may be easily cut or worn away, to accommodate the pipe shoe. The bolt and nut are preferably provided closely adjacent the base member, and accordingly are spaced from the lowermost portion of the first and second clamp portions a distance greater than the thickness of the insulation. A gap is provided between a lowermost portion of the pipe and the first and second clamp halves, thereby decreasing corrosion.

According to the method of the present invention, clamp portions are integrally formed with the first and second spacer members, which are permanently affixed to the base member substantially along the central axis of the pipe shoe. Accordingly, the process pipe may be raised from the pipe rack, and the pipe shoe positioned below the process pipe, and the pipe lowered so that the permanently affixed clamp portions engage the pipe. The pivotable plates may then be fitted through the respective slots of the opposing clamp members and rotated to their closed position. In new construction, the pipe shoe of the present invention may be loosely secured about the pipe, the pipe raised to the pipe rack, and the shoe then moved axially to its desired position on the pipe rack. The desired bitting force of the clamp members on the pipe may be obtained by tightening the bolt and nut, which brings the lowermost portion of each plate closely adjacent the vertical spacer members. An electric heating line or steam tracer line may be run beneath the pipe and in a gap provided between the first and second clamp halves. The insulation ay then be installed, with the vertical spacer members sandwiched between the insulation along its seam.

It is an object of the present invention to provide an improved pipe shoe which enables a pipe to be more easily protected with insulation.

A further object of the present invention is to provide a pipe shoe which enables standard pipe insulation to reliably protect the pipe.

It is a feature of the present invention that the pipe shoe includes first and second clamp portions for gripping engagement with the pipe, with neither of the clamp portions engaging a lowermost portion of the pipe when the pipe shoe is in the closed position, thereby decreasing corrosion of the pipe and the pipe shoe.

An advantage of the present invention is that the first and second clamp portions of a pipe shoe may be brought into their closed position about a pipe and maintained in that position by a single nut and bolt.

Another advantage of the pipe shoe according to the present invention is that a heating line may be easily and reliably installed beneath the pipe and between the first and second clamp portions, without the weight of the pipe pressing on the heating line.

According to one aspect of the invention, the pipe shoe includes a base member having a lower planar surface for sliding engagement with the horizontal planar surface of the pipe rack, a first clamp member including a vertical sheet-like spacer portion secured at its lower end to the base member and a first clamp portion having a C-shaped cross-sectional configuration secured to an upper end of the vertical spacer portion, a slot in the first clamp member, a second clamp member having a second clamp portion with C-shaped cross-sectional configuration and a plate projecting from an edge of the second clamp portion for fitting within the through slot of the first clamp member such that the second clamp member is pivotally movable with respect to the first clamp member from an opened to a closed position, and a securing member for permanently positioning the plate closely adjacent a sheet-like spacer portion of the first clamp member when the second clamp member is in its closed position so that the first and second clamp portions grip the pipe.

These and further objects, features, and advantages of the present invention will become apparent from the following detailed description, wherein reference is made to the figures in the accompanying drawings.

BRIEF DESCRIPTION OF THE DRAWINGS

FIG. 1 is a pictorial view of a pair of pipe shoes according to the present invention supporting a process pipe, with a portion of the pipe axially along one of the shoes being insulated.

FIG. 2 is a pictorial view of one of the shoes in FIG. 1 in its open position.

FIG. 3 is a detailed side view of the pipe shoe shown in FIG. 1, with the pipe being depicted in dashed lines.

DETAILED DESCRIPTION OF PREFERRED EMBODIMENTS

Figure 4:
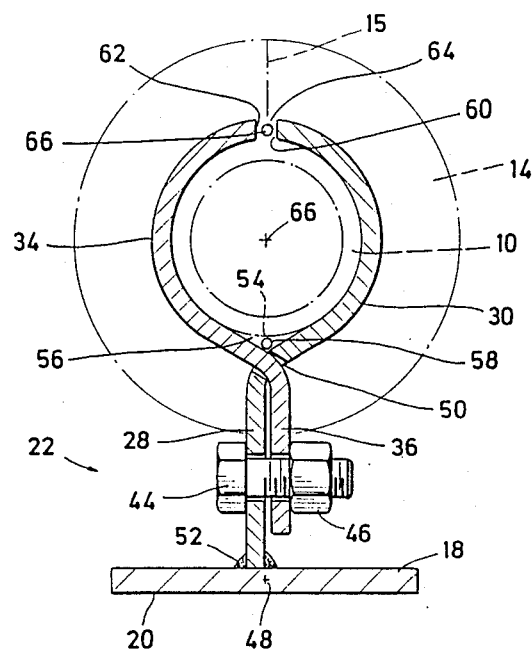
FIG. 4 is a cross-sectional view of one pipe clamp according to the present invention, with the pipe and insulation being depicted in dashed lines.

The pipe shoe of the present invention may be used for permanently supporting various tubular members, such as water conduits, steam pipes, condensate flow lines, heated chemical lines, or other process lines carrying fluids, either gaseous or liquid. Substantially parallel process lines of various diameters are generally provided in a commercial or industrial facility, and are normally supported on a series of pipe racks typically 20 feet apart. Such pipe racks generally have a top planar support surface, and each pipe shoe securely grips a given pipe and supports the pipe above the top surface of the pipe rack. The pipe shoe is allowed to move axially with respect to the pipe rack during thermal expansion and contraction of the pipe. The sliding movement of the pipe shoe thus prevents the pipe from rubbing against the pipe rack or other structural members, thereby increasing the useful life of the pipe.

The pipe shoe of the present invention is particularly useful for supporting an insulated pipe. Pipe insulation is typically provided along many of the process pipes to contain heat in the fluid passing through the pipe, and/or to reduce the likelihood of that liquid in the pipe may freeze during cold weather. Pipe insulation of various materials conventionally is provided in elongate identical halves axially split for placing about the installed pipe of a particular size to form a sleeve-like insulation. The present invention enables standard pipe insulation to be easily placed about the pipe in the vicinity of the pipe shoes, thereby decreasing installation time. The pipe shoe of the present invention also reduces heat loss from the pipe, minimizes corrosion or other deterioration of the pipe and the insulation, and enables an electric heating line or steam tracer line to be easily installed against the length of the process pipe.

Referring to FIG. 1, there is depicted a process pipe 10 supported on a pair of pipe shoes 12A and 12B, which in turn are placed on the upper planar surface of a conventional pipe racks (not depicted) 20 feet apart. A portion of the pipe 10, including that passing through the shoe 12A, is insulated with a standard axially split insulation 14, with the edges of the insulation mating along an upper seam 15 and lower seam 16 each within a vertical plane. It should be understood that shoe 12A and shoe 12B are identical, and pipe shoe 12B will normally be protected with the insulation 14.

Referring to FIGS. 1 and 2, each pipe shoe includes a base member 18 having a lower planar surface 20 for sliding engagement with the top surface of the pipe rack, and a pair of axially spaced pipe clamps 22, 24 each secured to the base 18. Pipe clamp 22 includes a first clamp member 26 having a vertical spacer portion 28 weldably secured at its lower end to base 18, and a clamp portion 30 having a C-shaped transverse cross-sectional configuration. Portion 30 may be welded along its lower edge to the upper end of the base 20, or may be integrally formed with base 28 by a stamping operation. Clamp 22 also includes a second clamp member 32 including a second clamp portion 34 having a C-shaped transverse cross-sectional configuration and a sheet-like plate 36 extending radially from an edge of the portion 34. The spacer portion 28 includes a hole 38 which is aligned with hole 40 in the plate 36 when the second clamp member is in its closed position, as shown in FIG. 1. Spacer portion 28 and the plate 36 are held in a position closely adjacent each other by a securing member 42, which comprises a bolt 44 and a nut 46 as shown in FIG. 3.

Clamp 24 is structurally identical to clamp 22, although the clamp member 26' has its clamp portion adapted for engaging an opposing side of the pipe. Similarly, while the clamp member 32 is adapted for engaging the left side of the pipe, clamp member 32' will engage the opposing right side of the pipe. The pipe shoe is provided with a central axis 48 which is preferably midway between the parallel sides of the base 18 and directly below the axis of the pipe 10. The supporting portion 28 is slightly spaced on the right side of the centerline 48, while the supporting portion 28' is slightly spaced on the left side of the centerline 48.

Referring to FIG. 3, clamp member 26 includes an elongate through slot 50 spaced axially midway along the length of the member 26. Slot 50 has an axial length sufficient to accommodate the plate 36, and has a height sufficient to allow the clamp member 32 to pivotally move with respect to the member 26 from an open position as shown in FIG. 2 to a closed position as shown in FIG. 1. Depending on the curvature of the lower portion of the clamp portion 30, the slot 50 may be provided within a lower part of portion 30 adjacent the spacer portion 28, or may be provided in an upper portion of spacer portion 28 adjacent the clamp portion 30. In either event, the slot 50 is provided in the first clamp member 26 adjacent the connection between the portions 28 and 30. A similar slot 50' is provided in the clamp member 26'.

FIG. 3 depicts the threaded bolt 44 and a nut 46 which together serve as a securing member, as noted above. The height of the spacer portion 28 may be varied to accommodate the thickness of the insulation which will wrap the pipe, and will typically be from 3 to 6 inches. Preferably, the securing member 42 is provided closer to the base 18 than to either of the clamp portions 30 or 34, so that the height of the pipe shoe may be minimized, and the securing member 42 provided beneath the lowermost portion of the insulation material, as shown in FIG. 1. As shown in FIGS. 2 and 3, the axial length of the clamp portions 30 and 34 for gripping engagement with the pipe is preferably identical, so that equal and opposite clamping forces are applied to the pipe shoe.

FIG. 3 depicts one of the pipe clamps and the base in transverse cross-section, illustrating the C-shaped configuration of the clamp portions 30 and 34. The vertical spacer portion 28 is permanently secured to base 18 by weld 52. FIG. 4 also depicts that the slot 50 is preferably provided in a lower portion of the first clamp portion 30, although the slot 50 could be provided in an upper portion of the spacer portion 28. FIG. 4 depicts the plate 36 extending through the slot 50, so that the sheet-like vertical spacer portion 28 and the sheet-like plate portion 36 are closely adjacent members each lying within substantially vertical planes when the second clamp portion 34 is in its closed position. This position is maintained by the bolt 44 and nut 46, so that tightening of the nut 46 moves the members 28 and 36 closer together, thereby exerting the desired clamping force of portions 30 and 34 on the pipe.

FIG. 4 also depicts that each of the first and second clamp members are formed such that a lowermost portion 54 of the pipe 10 is out of engagement with either of the first or second clamp members when the second clamp member is in its closed position. An advantage of this configuration compared to prior art pipe clamps is that uninsulated pipe tends to collect condensate and other contaminants on the exterior of the pipe 10, which move by gravity to its lowermost portion 54. This condensate or contaminant does not tend to corrode the pipe or the pipe shoe, however, since this lowermost portion 54 is not in engagement with either the clamp portions 30 or 34. More particularly, the configuration of the clamp portions 30 and 34 is such that a gap 56 is formed between the first and second clamp portions 30 and 34, respectively, and the lowermost portion 54 of the pipe. According to the present invention, a heating line 58 may be easily positioned within the gap 56 prior to positioning the insulation 14 about the pipe, and this heating line, which may consist of a conventional electric heating line or a steam tracer line, may thus keep the fluid in the pipe 10 at a desired temperature. The heating line 58 may preferably be run along a lowermost portion of the pipe even in the vicinity of the pipe shoes, thereby avoiding the difficulty of routing the heating line around the pipe shoe. This feature increases the efficiency of the heating line, and enhances reliability since repeated routing around the pipe shoe may lead to maintenance problems. If desired, the configuration of the clamp portions 30 and 34 may be changed slightly so that the size of the gap 56 is increased or decreased to accommodate the size of the intended heating line. In any event, it may be seen that the weight of the pipe 10 is supported on the clamp portions 30 and 34, and not on the heating line 58, which is conveniently positioned between the pipe 10 and the clamp portions 30 and 34.

The upper edge 60 of the clamp portion 30 and the upper edge 62 of the clamp portion 34 are on opposing sides of the pipe, and define an elongate slot 64 above the pipe and between the clamp portions 30 and 34 which, if desired, may receive a second heating line 66. Line 66 will thus be directly below the seam 15 of the insulation 14, and may be used in conjunction with line 58 for maintaining the fluid in the pipe 10 at its desired temperature.

In most applications, the lower seam 16 (see FIG. 1) of the insulation 14 in the vicinity of the clamps will be spaced apart slightly by the thickness of the spacer portion 28 and the plate 36, as well as the nominal gap (typically less than one eighth inch) between the members 28 and 36 when the clamp portion 34 is in its closed position. This gap is typically reduced when tension is applied to securing member 42. In other words, the edges of the pair of elongate insulation members which form the sleeve-like insulation may conventionally engage each other along the upper seam 15, and may be spaced slightly apart along the lower seam 16 in the vicinity of the pipe shoe. According to one technique, the edges of each of the pair of elongate insulation members may be cut slightly away in the vicinity of the pipe shoe so that the interior surface of the insulation will be maintained in engagement with the pipe. According to other techniques, a nominal amount of insulation along the lower seam 15 may be easily "worn away" by simply moving the insulation halves back and forth so that the members 28 and 36 abrade the insulation as the lower portions of the insulation halves move inward. Under still another technique, no insulation need be cut or abraded away, since the insulation itself is sufficiently compressible to conform to its sleeve-like configuration about the pipe. In any event, it should be understood that the pipe shoe of the present invention enables the elongate insulation halves to be easily positioned about the pipe in a manner much more efficiently than was possible according to the prior art pipe shoes as discussed previously.

FIG. 4 also depicts the central axis 48 of the pipe shoe directly beneath the axis 66 of the pipe. The spacer portion 28 is positioned slightly on one side of the central axis 48 of the pipe clamp, while the corresponding plate 28' as shown in FIG. 2 may be positioned on the opposing side of the centerline 48. Thus the clamp portions 30 rigidly secured to the base 20 may be provided on opposing sides of the centerline 48, as shown in FIG. 2, and the outer surface of the member 28 will be substantially aligned with the outer surface of the member 36', and similarly the outer surface of the member 36 will be substantially aligned with the outer surface of the member 28', so that the insulation will be easily fitted about the pair of clamps.

Figure 5:
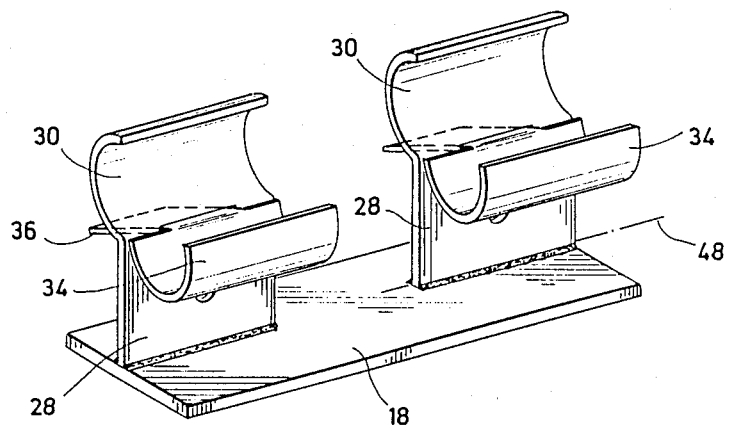
FIG. 5 is a pictorial view of another embodiment of the pipe shoe in its open position.

FIG. 5 depicts an alternate embodiment of the present invention which, in applications involving larger diameter pipe, may be preferred over the embodiment previously described. In FIG. 5, both support portions 28 are centered along the axis 48, since the fixedly connected clamp portions 30 are each provided on the same side of the pipe. Using this embodiment, the pipe clamp need not be rotated with respect to the pipe to position the pipe about the fixed clamp portion 30, as is the case for the embodiment shown in FIG. 2. The pipe shoe instead may be moved directly perpendicular to the pipe so that the portions 30 simultaneously engage the pipe, the plate portions 30 fitted within their respective slots 50, and the portions 34 rotated so that both portions 34 and both portions 32 grip the pipe so that no movement between the pipe and the pipe shoe will thereafter occur.

According to the method of the present invention and referring to FIG. 2, the first clamp member 26 including the unitary clamp portion 30 and the vertical spacer portion 28 are weldably secured to the base 18, while the corresponding clamp member 26' is positioned in an opposing relationship and similarly welded to the base 18. A slot 50 is formed in each of these members as previously discussed. A plate 36 permanently affixed to the second clamp portion 34, and may be positioned within the slot so that the second clamp portion 34 may be rotated to its closed position so that both the first and second clamp portions, and the corresponding third and fourth clamp portions, engage the pipe. Each of the plates 36 may then be permanently secured to its adjacent vertical spacer member 26 by the bolt and nut in order to maintain the clamp portions 34 in their closed position. The elongate insulation members may then be positioned about the pipe such that the adjacent edges of the pair of insulation members are positioned on opposing radially outward surfaces of the spacer member and the adjacent plate, respectively. Each of the clamp portions are preferably formed so that a lowermost portion of an exterior surface of the pipe is spaced from and is out of engagement with either the first or second clamp portions when in the closed position, as shown in FIG. 4. Moreover, the first and second clamp portions preferably define a gap between the lowermost portion of the exterior surface of the pipe and between the first and second clamp portions, and a heating line is run along the pipe and through this gap for heating the pipe.

With the embodiment as shown in FIG. 2, first clamp members 26 and 26' may be able to temporarily support the pipe until the second clamp members 32 and 32' can be fitted within the slot and rotated for engagement with the pipe. Also, the vertical spacer members 26 and 26' are preferably spaced on opposite sides of the central axis of the pipe clamp, thereby providing stability for supporting the pipe. According to the embodiment as shown in FIG. 5, the clamp portions 30 affixed to the pipe are provided on the same side of the centerline of the pipe shoe, thereby facilitating the operation of bringing these members 30 into engagement with the pipe. The second clamp members 32 may be fitted within the slots 50 and rotated for engagement with the pipe after the pipe has been brought into engagement with the portions 30. Alternatively, member 32 may be fitted within the slots and rotated to their open position, as shown in FIG. 5, then the pipe shoes moved so that portions 30 engage the pipe with the members 32 already in the slots 50, so that the members 32 may thereafter merely be rotated and secured by members 42 so that portions 30 and 34 grip the pipe.

It should thus be understood that the pipe shoe of the present invention has significant advantages over prior art pipe shoes. The insulation may be easily installed about the pipe and the pipe shoe, with little if any caulking required to minimize heat loss. The pipe shoe of the present invention does not include a pair of ears which project radially outward from each side of the pipe, and accordingly minimal heat is lost from the pipe. Moreover, the pipe shoe is constructed such that corrosion between the lowermost portion of the pipe and the pipe shoe is minimized, and a heat line can be easily run along a lowermost portion of the pipe and between the clamp portions 30 and 34. Finally, the apparatus of the present invention may be manufactured economically by relatively simple stamping and welding operations, and may be easily installed about a pipe and the pipe thereafter insulated according to the method of the present invention.

From the foregoing disclosure, various further modifications and alterations of the apparatus and method described above will be suggested. It should be understood, for example, that the pipe shoe of the present invention may include a single clamp 22 rather than a pair of clamps 22 and 24. Alternatively, three or more clamps may be provided along the same base, if desired. The configuration of the clamp portions may be varied so that a larger or smaller gap 56 is provided for receiving the heating line 58, and similarly the width of the elongate slot 60 along the upper portion of the pipe clamp may be varied as desired to receive an appropriately-size heating line. Electrical heating lines and steam heating lines are generally used for heating process pipes, although it should be understood that other elongate heating lines may be employed to provide additional heat to the process piping.

It should also be understood that conventional securing members other than a bolt 44 and nut 46 may be utilized, although the securing member depicted herein is preferred because of its simplicity and low cost. The spacer portion 28 is preferably a sheet-like member which lies substantially in a vertical plane, as herein described, although the spacer member may have other configurations or may be angled with respect to a vertical plane. Also, the plate 36 secured to the clamp portion 34 preferably is a sheet-like member, so that the opposing radially outward surfaces of the members 28 and 36 are spaced closely together when the pipe shoe is in the closed position, yet the pipe shoe is constructed in such a manner as to reliably support and grip the pipe.

As a further embodiment of the present invention, it should be understood that the slot 50 may be eliminated if the upper part of the C-shaped clamp portions 30 and 34 are configured so that the clamp portions interlock along their upper portions. In other words, the upper parts of the portions 30 and 34 may, for example, be provided with one or more mating dovetail members for interconnecting with similarly configured recesses in the other clamp portion, and the slot 50 may then be eliminated. In this case, the securing member 42 may nevertheless be provided adjacent the base 18 for moving the C-shaped clamp portions 30 and 34 into engagement with the pipe. This design is not preferred, however, because of its complexity and increased cost compared to the designs previously discussed and shown in the drawings.

The foregoing disclosure and description of the invention is illustrative and explanatory thereof, and various changes in the method steps as well as in the details of the illustrated apparatus may be made within the scope of the appended claims without departing from the spirit of the invention.

What is claimed is:

1. A pipe shoe for permanently supporting a length of process pipe above a pipe rack having a generally horizontal planar surface, the pipe shoe comprising:
   a base member having a lower planar surface for sliding engagement with the horizontal planar surface of the pipe rack;
   a first clamp member including a sheet-like spacer portion secured at its lower end to the base member, a first clamp portion having a C-shaped transverse cross-sectional configuration secured to an upper end of the spacer portion, and a through slot;
   a second clamp member including a second clamp portion having a C-shaped transverse cross-sectional configuration, and a plate projecting from an edge of the second clamp portion for fitting within the through slot in the first clamp member, such that the second clamp member is pivotally movable with respect to the first clamp member from an open position to a closed position; and
   a securing member for maintaining the plate adjacent the sheet-like spacer portion of the first clamp member when the second clamp member is in its closed position, such that the first and second clamp portions grip the process piping.

2. A pipe shoe as defined in claim 1, wherein the securing member is spaced vertically closer to the base member than to either the first or second clamp portions.

3. A pipe shoe as defined in claim 1, wherein the first and second clamp members are configured such that a lowermost portion of an exterior surface of the process pipe is spaced from and out of engagement with either the first or second clamp members when the second clamp member is in its closed position.

4. A pipe shoe as defined in claim 3, wherein the first and second clamp members define a gap beneath the lowermost portion of the exterior surface of the process pipe and between the first and second clamp member for receiving a heating line when the second clamp member is in its closed position.

5. A pipe shoe as defined in claim 1, wherein
   an axial length of the first and second clamp portions for gripping engagement with the process pipe is substantially identical; and
   upper edges of the first and second clamp portions oppose each other and define an upper elongate slot between the first and second clamp portions when the second clamp portion is in its closed position.

6. A pipe shoe as defined in claim 1, wherein:
   the plate has a sheet-like configuration;
   each of the plate and the vertical spacer portion has aligned through ports when the second clamp member is in its closed position; and
   the securing member includes a bolt which passes through the aligned through ports of the plate and the support member to maintain the sheet-like plate closely adjacent the sheet-like vertical spacer portion.

7. A pipe shoe as defined in claim 6, wherein the sheet-like spacer portion and the sheet-like plate each lie within substantially parallel vertical planes when the second clamp member is in its closed position.

8. A pipe shoe as defined in claim 1, further comprising:
a third- clamp member including a second sheet-like spacer portion secured at its lower end to the base member, a third clamp portion having a C-shaped transverse cross-sectional configuration secured to an upper end of the second vertical spacer portion, and a second through slot;
a fourth clamp member including a fourth clamp portion having a C-shaped cross-sectional configuration, and a second plate projecting from an edge of the fourth clamp portion for fitting within the second through slot of the third clamp member, such that the fourth clamp member is pivotally movable with respect to the third clamp member from an open position to a closed position; and
a second securing member for permanently positioning the fourth plate closely adjacent the second sheet-like spacer portion when the fourth clamp member is in its closed position, such that the second and third clamp portions grip the process pipe.

9. A pipe shoe as defined in claim 8, wherein:
the first and second vertical spacer portions are fixedly secured to the base member and are formed as a unitary component with the first and third clamp portions, respectively.

10. A pipe shoe as defined in claim 8, wherein:
the pipe shoe has a central axis coaxial with the gripped pipe when the second and fourth clamp members are in their closed position; and
the first and third clamp portions are fixedly positioned with respect to the base on the same side of the central axis of the pipe shoe.

11. A pipe shoe for supporting a length of pipe protected with a pair of elongate insulation members each circumferentially covering a portion of the pipe and together forming a sleeve-like insulation over the pipe, the pipe shoe comprising:
a base member;
a first clamp member including a sheet-like spacer portion secured at one end to the base member, a first clamp portion having a C-shaped cross-sectional configuration secured to an opposing end of the spacer portion, and a through slot;
a second clamp member including a second clamp portion having a C-shaped cross-sectional configuration and a plate projecting from an edge of the second clamp portion for fitting within the through slot in the first clamp member, such that the second clamp member is pivotally movable with respect to the first clamp member from an opened to a closed position; and
a securing member spaced between the sleeve-like insulation and the base member for maintaining the plate adjacent the sheet-like spacer portion of the first clamp member when the second clamp member is in its closed position, such that adjacent edges of the pair of elongate insulation members are positioned on opposing sides of the spacer portion and the adjacent plate, respectively, and the insulation retains its generally sleeve-like configuration.

12. A pipe shoe as defined in claim 11, wherein the first and second clamp members are configured such that a lowermost portion of an exterior surface of the process pipe is spaced from and out of engagement with either the first or second clamp members when the second clamp member is in its closed position.

13. A pipe shoe as defined in claim 12, wherein the first and second clamp members define a gap beneath the lowermost portion of the exterior surface of the process pipe and between the first and second clamp member for receiving a heating line when the second clamp member is in its closed position.

14. A pipe shoe as defined in claim 11, further comprising:
a third clamp member including a second sheet-like spacer portion secured at its lower end to the base member, a third clamp portion having a C-shaped transverse cross-sectional configuration secured to an upper end of the second vertical spacer portion, and a second through slot;
a fourth clamp member including a fourth clamp portion having a C-shaped cross-sectional configuration, and a second plate projecting from an edge of the fourth clamp portion for fitting within the second through slot of the third clamp member, such that the fourth clamp member is pivotally movable with respect to the third clamp member from an open position to a closed position; and
a second securing member for permanently positioning the fourth plate closely adjacent the second sheet-like spacer portion when the fourth clamp member is in its closed position, such that the third and fourth clamp portions grip the process pipe.

15. A pipe shoe as defined in claim 11 wherein:
the plate has a sheet-like configuration;
each of the plate and the vertical spacer portion has aligned through ports when the second clamp member is in its closed position; and
the securing member includes a bolt which passes through the aligned through ports plate and the support member to maintain the sheet-like plate closely adjacent the sheet-like vertical spacer portion.

16. A pipe shoe as defined in claim 15, wherein the sheet-like spacer portion and the sheet-like plate each lie within substantially parallel vertical planes when the second clamp member is in its closed position.

17. A method of supporting and insulating a length of pipe on a pipe shoe above a pipe rack having a generally horizontal planar surface, the pipe shoe having a base member for sliding engagement with the horizontal planar surface of the pipe rack, a vertical spacer member secured to and projecting upward from the base member, first and second clamp portions each having a C-shaped cross-sectional configuration for circumferentially engaging the pipe, a securing member for maintaining the first and second clamp portions in gripping engagement with the pipe, and a pair of elongate insulation members each circumferentially covering a portion of the pipe and together forming a sleeve-like insulation, the method comprising:
permanently affixing the first clamp portion to the vertical spacer member such that the first clamp portion with engage one side of the pipe;
forming a through slot in a lower portion of the first clamp portion;

permanently affixing a plate to the second clamp portion;

positioning the plate within the through slot of the first clamp portion and rotating the second clamp portion with respect to the first clamp portion to a closed position, such that the second clamp portion engages an opposing side of the pipe and the plate is adjacent the vertical spacer member;

securing the plate in its position adjacent the vertical spacer member with the securing member to maintain the secured clamp portion in its closed position; and positioning the pair of elongate insulation members about the pipe and the first and second clamp portion such that adjacent edges of the pair of insulation members are positioned on opposing radially outward surfaces of the spacer member and the adjacent plate, respectively.

18. A method of supporting and insulating a length of pipe as defined in claim 17, wherein the securing member is spaced vertically between the sleeve-like insulation and the base member.

19. A method of supporting and insulating a length of pipe as defined in claim 17, wherein each of the first and second clamp portions are formed such that a lowermost portion of an exterior surface of the pipe is spaced from and out of engagement with either the first or second clamp portions when the second clamp portion is in its closed position.

20. A method of supporting and insulating a length of pipe as defined in claim 19, wherein:

the first and second clamp portions define a gap between the lowermost portion of the exterior surface of the pipe and between the first and second clamp portions; and running a heating line along said pipe and between said sleeve-like insulation and said pipe and through said gap between the first and second clamp portions for heating said pipe.

* * * * *

UNITED STATES PATENT AND TRADEMARK OFFICE
CERTIFICATE OF CORRECTION

PATENT NO.  : 4,858,861

DATED       : August 22, 1989

INVENTOR(S) : Joseph Wilkinson, III

It is certified that error appears in the above-identified patent and that said Letters Patent is hereby corrected as shown below:

In column 3, line 60, delete "ay" and insert therefor --may--.

In column 12, line 36, after "11" insert --,--.

In column 12, line 42, after "ports" insert --of the--.

Signed and Sealed this

Twenty-fourth Day of July, 1990

Attest:

HARRY F. MANBECK, JR.

Attesting Officer

Commissioner of Patents and Trademarks